3,152,088
PROCESS FOR PREPARING SUPPORTED CATALYSTS AND CATALYSTS OBTAINED FROM SAME
Battista Sandri and Antonio Monte, Ferrara, Italy, assignors to Montecatini, Società Generale per l'Industria Mineraria e Chimica, Milan, Italy
No Drawing. Filed Apr. 24, 1961, Ser. No. 104,859
Claims priority, application Italy Apr. 27, 1960
13 Claims. (Cl. 252—429)

The present invention relates to a process of preparing a supported catalyst, consisting of at least 2 components, for use in the stereospecific polymerization of alpha-olefins.

Processes for the polymerization of alpha-olefins with the aid of catalysts containing halides of transition metals of Groups IV, V, VI, and VIII of the Mendeléeff Periodic Table in which the metal has a valency lower than its maximum, and organometallic compounds of metals of Group II or III (having the formula $MeR_pX_qY_r$ where Me is a metal of said groups, R is an alkyl, aryl or cycloalkyl radical, X and Y are either R or a halogen, $p$ is 1, 2 or 3, $q$ and $r$ are either 0, 1 or 2 and $pqr$ is equal to the valency of Me), which have a high stereospecificity, are already known.

The aforementioned transition metal halides are in general solid crystalline products which are obtained by high temperature reduction of the corresponding more easily available halides in which halides the metals possess their maximum valency, such as $TiCl_4$, $ZrCl_4$, $VCl_4$, $MoCl_3$, $WCl_3$, $FeCl_3$, etc.

Processes for carrying out this reduction at high temperature in the vapor phase with hydrogen or at lower temperatures with the aid of organometallic compounds, metal hydrides or metals, are well known in the art.

The preparation of these lower valency halides, however, presents some practical problems of considerable importance. In the case of reduction at high temperature, the presence of HCl and the high operating temperature favor corrosion and, moreover, the separation of the solid halide product from the condensed phase (by filtration) or from the gaseous phase (by means of cyclone separators and by washing with a liquid halide) is particularly difficult due to the extreme fineness of the product which is obtained.

The reduction processes at low temperature on the other hand have two main disadvantages, namely:

(1) In the reduction with organometallic compounds the highly exothermic character of the reaction makes necessary the dilution of the reactants or the use of a large excess of liquid halide. Moreover, it is difficult to stop the reduction at the first stage and therefore halides with a lower degree of valency or even some metal are nearly always formed. Furthermore, the aforementioned difficulties relating to the separation and purification of the solid product from the high temperature reduction process are also experienced in the present case since the halide is recovered as a very fine power from the excess of liquid reactants.

(2) In the reduction with metals the exothermic character of the reaction (even if it is lower than that of the preceding case) always requires dilution with solvent or with an excess of liquid halide. The degree of reduction in this case can be controlled more easily, but recovery problems similar to those of the preceding case and also due to the fineness of the product, are complicated by the presence of the halide of the reducing metal.

A particular difficulty in the use of solid crystalline halides of transition metals in the polymerization of alpha-olefins is encountered when the polymerization is carried out in the absence of the liquid phase. As is known, stereospecific polymerization processes can be carried out in the gaseous phase, in the absence of liquid diluent or monomer, in various ways.

If the solid crystalline halides are used in these gaseous phase polymerizations, the fineness of the catalyst product introduces a further difficulty because the gases in a continuous process tend to entrain the powder and complex separation systems are therefore required.

It has been suggested to solve this problem by fixing the catalyst or the transition metal halide in some way onto a granular inert support, such a support preferably consisting of the same type of polymer as produced in the process. However, even when the support can be impregnated with liquid halides, the fixing of these solid halides onto the support is almost impossible or, at least, they are attached in a very insecure manner and therefore the entrainment phenomena still take place. The higher the rate of the feed, the more pronounced is this entrainment phenomena. This entrainment problem is therefore a fundamental difficulty in all cases in which particularly high flow rates are adopted in order to remove the heat of reaction. Of course, besides the separation problems entailed, this entrainment of a portion of the catalyst obviously reduces the yield.

The use of a polymerization catalyst prepared in the presence of the granular polymer by reacting halides having a maximum degree of valency with an organometallic compound in the presence of a hydrocarbon diluent has already been proposed. Upon evaporation of the solvent, a catalyst partially supported on the polymer granules is obtained.

The polymerization of alpha-olefins with this supported catalyst, however, gives products containing considerable percentages of a heptane-soluble product.

The polymerization of alpha-olefins using catalysts prepared in an analogous manner by reacting solid crystalline transition metal halides with organometallic compounds in the presence of a granular polymer and of a diluent with the subsequent evaporating of the solvent is also known. In this case, however, although the high stereospecificity of this type of catalyst is maintained, the support is still not very secure and in the gaseous phase catalysts entrainment still occurs.

We have now surprisingly found a method for supporting the catalyst in a permanent manner on a granular polymer, which method makes it possible to polymerize olefins to a high stereo-specificity without the above mentioned difficulties.

An object of the present invention is to provide a process for preparing an olefin polymerization catalyst wherein a halide of a heavy transition metal in its maximum valency state, and impregnated on an inert support, is treated with an organometallic compound impregnated on an inert support.

Another object of the invention is the providing of a process for preparing an olefin polymerization catalyst wherein a halide of a heavy metal in its maximum valency state, impregnated on an inert support, is treated with an organometallic compound impregnated on an inert support and with additional organometallic compound impregnated on an inert support. The above mentioned inert supports may be granular polymers, either the same or different from one another.

Other objects of this invention will be apparent from the following description and examples.

The process of the present invention has the following advantages:

(1) A diluent or solvent is unnecessary.

(2) The heat developed per time unit is reduced to a minimum, since the reduction reaction occurs in a very gradual manner by reciprocal diffusion of the reactants between the various support granules. The same support mass thus acts as thermal stabilizer.

(3) Careful control of the degree of reduction is achieved by moderating the heat development and suitably adjusting the stoichiometric ratio between the reactants.

(4) The halide in the reduced form remains completely fixed on the support and cannot be removed by washing or ventilation. More particularly, in a continuous gaseous phase polymerization plant, e.g., one employing fluidized beds, the catalyst entrainment is completely avoided thus permitting the use of a rapidly flowing current of gases.

The reaction product obtained, according to the present invention, is equivalent to solid crystalline halides in all their polymerization applications whether in the liquid or gaseous phase. Of course, depending on the particular polymerization use, suitable amounts of organometallic compounds and other activating ingredients may be added if desired.

There are no particular limits for the amounts of liquid transition metal halide and of organometallic compounds with which a given amount of support can be impregnated, except for those limits dictated by the surface area and the absorption characteristics of the different types of supports.

If, for safety reasons, the organometallic compound is diluted with a hydrocarbon solvent, the amount with which the support can be impregnated is slightly more limited. For example, in the case of a polypropylene support, the maximum practical value has been determined to be 1 g. of a 20% solution of the organometallic compound per 1 g. polypropylene.

The ratio of organometallic compound to high valency halide (e.g., $Al(C_2H_5)_3/TiCl_4$) in the first reduction stage is, for the best results, limited to between 5:1 and 1:1 (by mols), preferably between 4:1 and 2:1 (by mols).

The ratio of additional organometallic compound (e.g., $Al(C_2H_5)_3$) and the initial high valency halide (e.g., $TiCl_4$) in the second catalyst preparation stage is from 0.5:1 to 10:1 (by mols), preferably from 1:1 to 3:1.

The temperature at which the catalyst can be prepared varies between $-50°$ C. and $+150°$ C., depending on the characteristics of the support.

Some examples of applications to which the present invention may be put are given hereinbelow. In each case, $TiCl_4$ is used as transition metal halide and triethyl aluminium as organometallic compound.

It is to be understood, however, that these examples are not intended to limit the invention in any way to the use of titanium halides and alkyl aluminium compounds. Other halides such as $ZrCl_4$, $VCl_4$, $MoCl_3$, $WCl_3$, $FeCl_3$ and the like or other metal organic compounds such as $LiC_4H_9$, $Be(C_2H_5)_2$, $Zn(C_2H_5)_2$, $C_2H_5MgCl$, $C_2H_5MgBr$, $Al(C_2H_5)_2Cl$, $Al(C_2H_5)_2H$, $Al[C(CH_3)_3]_3$, and the like may be used. Moreover, the process of the invention is applicable not only to two-component catalysts, but also to catalysts having more components, in particular to those catalysts having additional substances such as pyridine and a phosphine added to improve the stereospecificity of the catalyst. These additional substances or activators are described in other patents or patent applications of the present applicants (see particularly U.S. patent applications Serial No. 781,465 and No. 861,183).

It is also to be noted that other supports such as anhydrous silica, alumina, $CaCO_3$, $CaCl_2$, NaCl and the like can be used instead of the solid polymer. Thus it is also clear that solid support polymer may be the same or different than the polymer to be obtained in the polymerization. Any inert, anhydrous, solid, preferably porous and with a high specific volume, support can be used, provided it remains unaltered under the catalyst preparation conditions and during the polymerization process and it does not soften and/or agglomerate under the above conditions.

As has already been pointed out above, the supported catalysts of the present invention may be used for the polymerization of alpha olefins, or the copolymerization of such alpha olefins. Exemplary of the alpha olefins that may be homopolymerized or mixtures of which may be copolymerized are the linear alpha olefins such as ethylene, propylene, butene-1, hexene-1-, hepene-1, octene-1, octadecene-1, dodecene-1-, 4- and 5-methyl heptenes, etc., and substituted derivatives thereof such as styrene, allyl benzene, vinyl cyclohexane and the like.

As is known to the art subsequent to the discoveries of Natta et al., and as will be seen from the following working examples, the residue from the boiling heptane extraction indicates the presence of isotactic polypropylene macromolecules.

*Example 1*

20 g. of solid polypropylene and 4.8 g. of $TiCl_4$ are introduced into a dried and evacuated glass flask at room temperature under nitrogen while maintaining agitation until the polymer is a homogeneous yellow-orange. After heating to $75°$ C., 20 g. of polypropylene previously impregnated with 3.9 g. of $Al(C_2H_5)_3$ (as a 20% solution in heptane) are added within 1 hour.

The previous impregnation of the polypropylene with the triethyl aluminium was carried out at room temperature by introducing the products into a flask which is closed with a stopper and shaking the flask for some time. This impregnation flask is connected through a flexible transparent polyvinyl chloride pipe with the glass flask containing the polypropylene and $TiCl_4$.

During the addition of the triethyl aluminium impregnated polypropylene, agitation is continued and the temperature is controlled by regulating an external heat exchange bath.

At the end of the addition, the temperature of the bath is raised to $140°$ C. and kept at this level for another hour. The temperature is then lowered again to $75°$ C. and 5 g. of polypropylene, which has been impregnated with 12. g. of pyridine at room temperature (prepared in a manner similar to that as described for $Al(C_2H_5)_3$), are added. The agitation is continued at a temperature of $75°$ C. for 30 minutes.

The catalyst product is cooled and transferred completely, while under nitrogen, into a 3.2-liter autoclave. A further 20 g. of polypropylene, impregnated with 4.0 g. of $Al(C_2H_5)_3$ in the above mentioned manner, are introduced. Agitation is started, the autoclave is heated to 40–50° C. and gaseous propylene is introduced up to a pressure of 5 atmospheres. The reaction starts quickly and is continued for 19 hours by keeping the temperature at $75°$ C. and the propylene pressure at 5 atmospheres.

At the termination of the polymerization and after cooling, 770 g. of dry polymer having the following characteristics are discharged from the autoclave:

Residue after extraction with boiling heptane
percent__ 84
Residue after extraction with boiling ether __do____ 85
Flexural strength _____kg./cm.$^2$__ 7050

*Example 2*

By preparing the catalyst in the manner of Example 1 and simply reducing the amount of pyridine which is used to 0.6 g., a polymerization run is carried out at $75°$ C. under a pressure of 3 atmospheres.

At the end of a run of 10 hours, 900 g. of a propylene polymer having the following characteristics are discharged from the reactor:

Residue after extraction with boiling heptane
percent__ 82
Residue after extraction with boiling ether __do____ 87.5
Flexural strength _____kg./cm.$^2$__ 6500

*Example 3*

The catalyst is prepared as in Example 1, i.e., by reacting 4.8 g. of $TiCl_4$ supported on 20 g. of propylene polymer, 3.9 g. of Al(C₂H₅)₃, also supported on 20 g. of polymer, and 0.6 g. of pyridine on 5 g. of polymer. Two continuous runs employing this catalyst and using fluidized bed technique are carried out. The polymerization is carried out at 75° C., under a pressure of 1 atmosphere in a 4-liter reactor, using a high rate of gas recycle (0.5 m./sec.). The catalyst is introduced at the rate of 10 g./hour, corresponding to 0.7 g. of TiCl₄, while the triethyl aluminium to be used for the polymerization is introduced into the reactor at a rate of 1.2 g./h. together with the recycling gas.

The runs are stopped after 350 hours and both the reactor and the expansion chamber are found to be perfectly clean.

An average of 160 g./hour of polymer having the following characteristics is obtained:

Residue from the extraction with boiling heptane _____ percent __ 80
Residue from the extraction with boiling ether
                                                percent __ 85
Flexural strength _____ kg./cm.² __ 6500

Example 4

By preparing the catalyst as described in Example 1, i.e., by reacting 3.8 g. of TiCl₄, supported on 20 g. of polymer, with 3 g. of Al(C₂H₅)₃, also supported on 20 g. polymer, a non-continuous polymerization run in a 2-liter autoclave is carried out. There is used as an organic polymerization metallo organic component a mixture consisting of 5.3 g. of triethyl aluminium etherate and 1.44 g. of Be(C₂H₅)₂ supported on 20 g. polymer.

The run is carried out at 75° C. under 5 atmospheres for 12 hours. At the termination, 700 g. of polymer having the following characteristics are discharged from the reactor:

Residue from the extraction with boiling heptane _____ percent __ 90
Residue from the extraction with boiling ether
                                                percent __ 93
Flexural strength _____ kg./cm.² __ 9200

Example 5

By operating as described in Example 1, 3.75 g. of TiCl₄ supported on 20 g. of propylene polymer are reacted with 3 g. of Al(C₂H₅)₃ supported on 20 g. of polymer. At the end of the reaction, 0.47 g. of pyridine, also supported on 5 g. of polypropylene are added.

The catalyst thus obtained is introduced into a 2.5-liter autoclave into which 1 liter of dry heptane has been previously introduced.

After the addition of 3.2 g. of Al(C₂H₅)₃ supported on 20 g. of propylene polymer, the pressure in the autoclave is raised to 5 atmospheres with propylene and the run is started at 75° C.

After 18 hours, 700 g. of polymer having the following characteristic is obtained:

Residue from the extraction with boiling heptane _____ percent __ 77
Residue from the extraction with boiling ether
                                                percent __ 82
Flexural strength _____ kg./cm.² __ 6000

Example 6

By proceeding as described in Example 1, a supported catalyst is prepared from:

4.0 g. of TiCl₄ impregnated on 20 g. of polypropylene,
5.0 g. of Al(C₂H₅)₃ impregnated on 20 g. of polypropylene,
0.6 g. of pyridine impregnated on 5 g. of polypropylene, and
4.0 g. of Al(C₂H₅)₃ impregnated on 20 g. of polypropylene.

A polymerization run is carried out using this catalyst in a 3.2-liter autoclave at 75° C., while under a constant pressure of 5 atmospheres of propylene for 16 hours. At the end of the reaction, 750 g. of dry polypropylene having the following characteristics are discharged:

Residue from the extraction with boiling heptane _____ percent __ 84.1
Residue from the extraction with boiling ether
                                                percent __ 86.1
Flexural strength _____ kg./cm.² __ 7500

Example 7

By operating as described in Example 1, a supported catalyst is prepared by reacting for 1 hour at 130° C., 3 g. of TiCl₄ and 3 g. of Al(C₂H₅)₃, both supported on 20 g. of polypropylene polymer.

After cooling, 0.9 g. of (LiCl.H₂O.2 pyridine) are added and the product is kept at 75° C. for 30 minutes.

Using the catalyst so obtained, to which a further 3.4 g. of Al(C₂H₅)₃ are added, a polymerization run is carried out in 2.5-liter autoclave at 75° C. and under 5 atmospheres of propylene.

The reaction starts rapidly, and within 4 hours, 800 g. of a completely granulated propylene having a high apparent density are discharged from the autoclave.

The characteristics of the polymer are:

Residue after extraction with boiling heptane _____ percent __ 86
Flexural strength _____ kg.²/cm.² __ 8000
Molecular weight _____ 210.000

Many modifications can, of course, be made and variations practiced without departing from the spirit of the present invention.

Having thus described the present invention, what it is desired to secure and claim by Letters Patent is:

1. In a process for preparing a supported catalyst for use in the stereospecific polymerization of alpha-olefins, containing (a) a halide of a heavy transition metal, having a valence lower than its maximum valence, the heavy transition metal being selected from the class consisting of the 4th, 5th, 6th and 8th groups of the Mendeléeff Periodic Table, and (b) an organometallic compound of a metal selected from the class consisting of the 2nd and 3rd groups of the Mendeléeff Periodic Table, said transition metal halide being obtained by reacting the halide of the transition metal possessing its maximum valence with the organometallic compound, the improvement which comprises (1) impregnating a first solid support with said transition metal halide possessing its maximum valence, (2) impregnating a second solid support with from 1 to 5 moles, per mole of the transition metal halide possessing its maximum valence, of at least one organometallic compound, (3) admixing the resulting impregnated first and second supports and maintaining a temperature from −50° C. to +150° C. so as to react the transition metal halide and organometallic compound impregnated on the supports, and (4) adding to the reaction product so obtained an additional amount of from 0.5 to 10 moles per mole of the maximum valence transition metal halide, of an organometallic compound described above in (b).

2. A process according to claim 1, wherein the first and second solid supports used are similar to each other.

3. A process according to claim 1, wherein the first and second solid supports used are different from each other.

4. A process according to claim 1, wherein a small amount of a component capable of increasing the stereospecificity of the catalyst is added, said component being selected from the group consisting of amines and phosphines supported on a third support material.

5. A process according to claim 4, wherein pyridine supported on a solid support material is used as the component capable of increasing the stereospecificity of the catalyst.

6. The process of claim 1, wherein (a) is a titanium trihalide, (b) is a trialkyl aluminum and the molar ratio between the initially reacted alkyl aluminum and titanium halide impregnated on said first and second solid supports is from 5:1 to 1:1.

7. The process of claim 1, wherein (a) is $TiCl_3$, (b) is triethyl aluminum and the molar ratio between the triethyl aluminum and the $TiCl_3$ is from 4:1 to 2:1.

8. The process of claim 1, wherein the organometallic compound added in step (4) is triethyl aluminum.

9. The process of claim 1, wherein the organometallic compound added in step (4) contains beryllium diethyl.

10. The process of claim 1, wherein said additional amounts of organometallic compound are supported on a third solid support.

11. The process of claim 1, wherein polypropylene is employed as both said first solid support and said second solid support.

12. A supported catalyst obtained by the process of claim 4.

13. A supported catalyst obtained by the process of claim 1.

References Cited in the file of this patent
UNITED STATES PATENTS

| | | |
|---|---|---|
| 2,827,446 | Breslow | Mar. 18, 1958 |
| 2,881,156 | Pilar et al. | Apr. 7, 1959 |
| 2,943,063 | Eby et al. | June 28, 1960 |
| 2,954,367 | Vandenberg | Sept. 27, 1960 |
| 2,967,176 | Pilar | Jan. 3, 1961 |
| 2,967,834 | Daniel et al. | Jan. 10, 1961 |
| 2,972,607 | Coover et al. | Feb. 21, 1961 |

UNITED STATES PATENT OFFICE
CERTIFICATE OF CORRECTION

Patent No. 3,152,088            October 6, 1964

Battista Sandri et al.

It is hereby certified that error appears in the above numbered patent requiring correction and that the said Letters Patent should read as corrected below.

Column 4, line 39, for "12. g." read -- 1.2 g. --.

Signed and sealed this 26th day of January 1965.

(SEAL)
Attest:

ERNEST W. SWIDER            EDWARD J. BRENNER
Attesting Officer            Commissioner of Patents